US008237697B2

(12) United States Patent
Song et al.

(10) Patent No.: US 8,237,697 B2
(45) Date of Patent: Aug. 7, 2012

(54) AMPLIFIER CIRCUITS IN WHICH COMPENSATION CAPACITORS CAN BE CROSS-CONNECTED SO THAT THE VOLTAGE LEVEL AT AN OUTPUT NODE CAN BE RESET TO ABOUT ONE-HALF A DIFFERENCE BETWEEN A POWER VOLTAGE LEVEL AND A COMMON REFERENCE VOLTAGE LEVEL AND METHODS OF OPERATING THE SAME

(75) Inventors: Nam Jin Song, Gyeonggi-do (KR); Yoon Kyung Choi, Gyeonggi-do (KR); Kyung Myun Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1087 days.

(21) Appl. No.: 11/846,647

(22) Filed: Aug. 29, 2007

(65) Prior Publication Data

US 2008/0019159 A1 Jan. 24, 2008

Related U.S. Application Data

(63) Continuation-in-part of application No. 11/589,353, filed on Oct. 30, 2006, now Pat. No. 7,952,553.

(30) Foreign Application Priority Data

Jun. 12, 2006 (KR) ........................ 10-2006-0052397

(51) Int. Cl.
*G06F 3/038* (2006.01)
*G09G 5/00* (2006.01)

(52) U.S. Cl. ......... 345/211; 345/204; 345/212; 330/253

(58) Field of Classification Search ............ 345/98-100, 345/204, 211-213; 330/253, 255, 260, 292
See application file for complete search history.

(56) References Cited

U.S. PATENT DOCUMENTS 7,652,538 B2 1/2010 Choi
7,760,199 B2 7/2010 An
(Continued)

FOREIGN PATENT DOCUMENTS

JP 2006-094534 4/2006
(Continued)

OTHER PUBLICATIONS

Korean Office Action (9 pages) corresponding to Korean Application No. 10-2007-0054594; Mailing Date: Apr. 17, 2009.
(Continued)

*Primary Examiner* — Kimnhung Nguyen
(74) *Attorney, Agent, or Firm* — Myers Bigel Sibley & Sajovec, P.A.

(57) ABSTRACT

A switch circuit includes a first capacitor, a second capacitor, and a switch arrangement that is operable to connect the first capacitor and the second capacitor in series between a first node that supplies a first voltage level and a second node that supplies a second voltage level, or to disconnect the first capacitor and the second capacitor from the first node and the second node, respectively, and to cross-connect the first capacitor and the second capacitor in response to a first control signal.

5 Claims, 15 Drawing Sheets

U.S. PATENT DOCUMENTS

| | | | | |
|---|---|---|---|---|
| 2005/0040889 | A1* | 2/2005 | Tsuchi | 330/255 |
| 2006/0091955 | A1 | 5/2006 | Choi | |
| 2006/0125759 | A1 | 6/2006 | An | |
| 2006/0279356 | A1 | 12/2006 | An | |

FOREIGN PATENT DOCUMENTS

| | | | |
|---|---|---|---|
| KR | 10-2002-0063733 | A | 8/2002 |
| KR | 10-2005-0080234 | A | 8/2005 |
| KR | 2006-0028119 | | 3/2006 |
| KR | 2006-0124432 | | 5/2006 |
| KR | 2006-0064941 | | 6/2006 |

OTHER PUBLICATIONS

Korean Notice to Submit Response to an Office Action (5 pages) corresponding to Korean Patent Application No. 10-2007-0054594; Issue Date: Sep. 8, 2008.

* cited by examiner

300

FIG. 11A
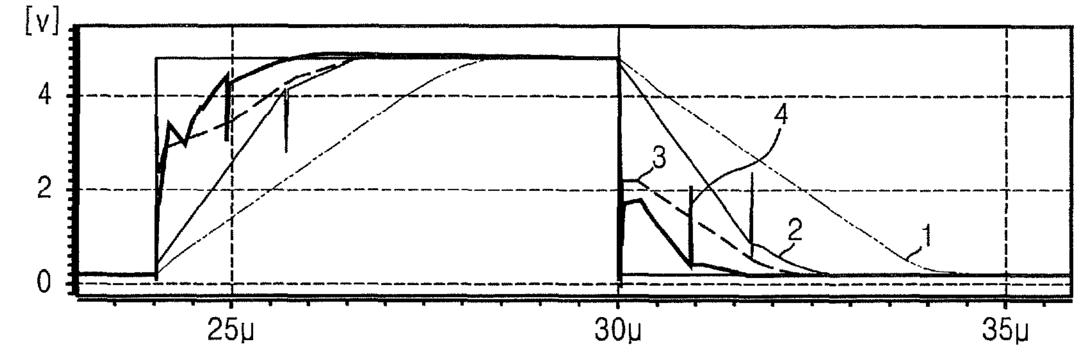
FIG. 11B
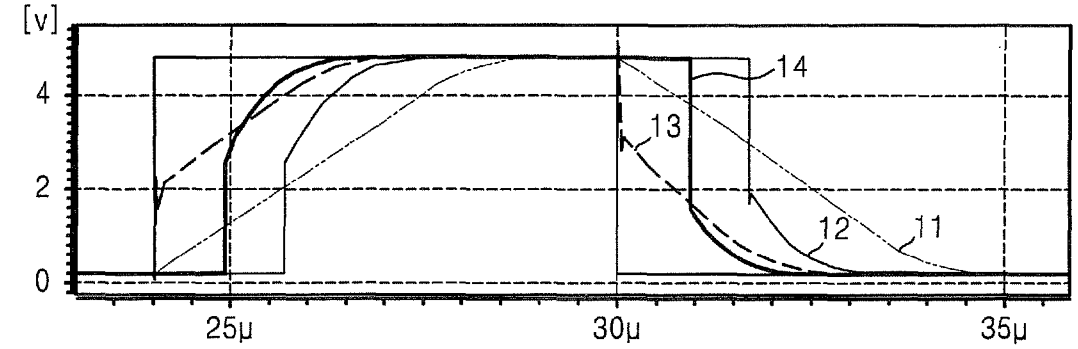
FIG. 11C
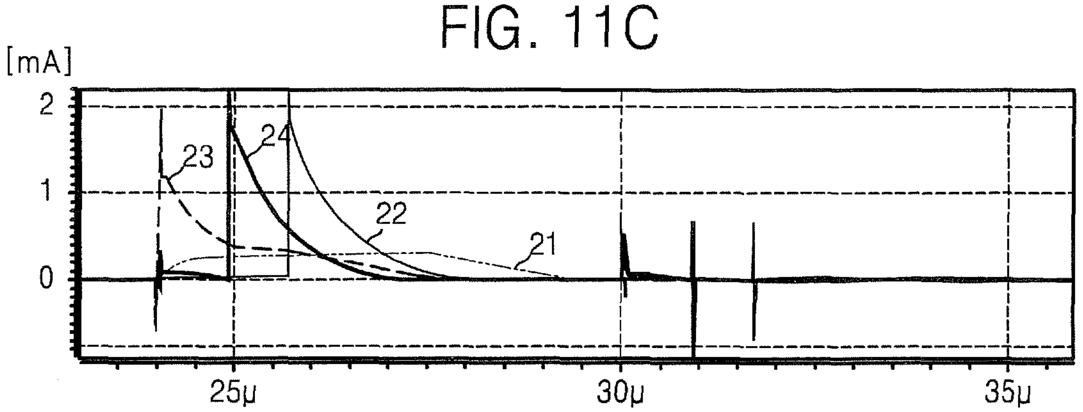
FIG. 11D
| | Current (µA) | Tr (µs) 99.5% | Tf (µs) 99.5% |
|---|---|---|---|
| FR+FSR | 11.51 | 2.422 | 2.439 |
| FR | 11.61 | 3.094 | 2.831 |
| FSR | 11.57 | 3.352 | 3.377 |
| Normal | 11.54 | 4.898 | 4.760 |

AMPLIFIER CIRCUITS IN WHICH COMPENSATION CAPACITORS CAN BE CROSS-CONNECTED SO THAT THE VOLTAGE LEVEL AT AN OUTPUT NODE CAN BE RESET TO ABOUT ONE-HALF A DIFFERENCE BETWEEN A POWER VOLTAGE LEVEL AND A COMMON REFERENCE VOLTAGE LEVEL AND METHODS OF OPERATING THE SAME

RELATED APPLICATION

This application is a continuation in part of U.S. patent application Ser. No. 11/589,353 filed Oct. 30, 2006 now U.S. Pat. No. 7,952,553, which claims priority to Korean Patent Application No. P2006-0052397, filed Jun. 12, 2006, in the Korean Intellectual Property Office, the disclosures of which are hereby incorporated herein by reference as if set forth in their entireties.

FIELD OF THE INVENTION

The present invention relates generally to integrated circuit devices and methods of operating the same and, more particularly, to amplifier circuits for a display device and methods of operating the same.

BACKGROUND OF THE INVENTION

As the resolution of mobile devices increases, source amplifiers in the source driver may need to drive display panels faster. In addition to increased speed, however, it is also desirable to maintain relatively low power consumption to conserve battery life in devices, such as mobile phones, personal digital assistants, and the like. For example, the bias current of a typical mobile Liquid Crystal Display Integrated Circuit (LDI) source driver amplifier is less than 1 μA. However, there may be hundreds of source driver amplifiers in an LDI so even relatively small increases in the bias current of a source driver amplifier may significantly shorten battery life.

FIG. 1 illustrates a conventional source driver amplifier circuit that is configured as a unity-gain buffer in which the output node VOUT is connected to the negative input node inn. FIGS. 2A and 2B illustrate plots of an input voltage waveform applied to the amplifier of FIG. 1 and the output voltage waveform generated in response to the input voltage waveform, respectively. The input voltage waveform changes at the beginning of a new row-line scan as shown in FIG. 2A. The source driver amplifier drives the column line of the display panel in response to the input voltage waveform. As shown in FIG. 2B, the driving time for generating the output voltage waveform is influenced primarily by the slew rate of the source driver amplifier. The slew rate (SR) may be expressed as follows: $SR=I_b/C_m$, where $I_b$ is the tail current of the input differential stage and $C_m$ is the capacitance of the compensation capacitors. The source driver amplifier circuit of FIG. 1 includes two compensation capacitors $C_P$ and $C_N$. Because the bias current of a conventional source driver amplifier is relatively small, the dominant factor that limits the driving time of the amplifier is the speed at which the compensation capacitors can be charged and discharged.

Also, in Korean patent application No. 10-2004-0077156, a technology (hereinafter, "FSR technology") that is capable of improving slew rate by changing total capacitance of compensation capacitors according to each operational section of an amplifier, is provided. According to FSR technology, the time period allocated to performing the slewing is changed according to a level of an input voltage at the beginning of the operation. Therefore, the settling time of each operational time period can be different according to the difference between a current voltage level and an input voltage level of the next operational section.

SUMMARY

According to some embodiments of the present invention, a switch circuit includes a first capacitor, a second capacitor, and a switch arrangement that is operable to connect the first capacitor and the second capacitor in series between a first node that supplies a first voltage level and a second node that supplies a second voltage level, or to disconnect the first capacitor and the second capacitor from the first node and the second node, respectively, and to cross-connect the first capacitor and the second capacitor in response to a first control signal.

In other embodiments, the switch arrangement is operable to adjust each capacitance of the first capacitor and the second capacitor in response to a second control signal.

In still other embodiments, the switch circuit further includes a third capacitor and a fourth capacitor. The switch arrangement is operable to connect the third capacitor with the first capacitor in parallel and to connect the fourth capacitor with the second capacitor in parallel, or to disconnect the third capacitor from the first capacitor and to disconnect the fourth capacitor from the second capacitor in response to a second control signal.

In further embodiments, a method of operating a switch circuit includes disconnecting a first capacitor and a second capacitor connected in series from a first node supplying a first voltage level and a second node supplying a second voltage level and cross-connecting the first capacitor with the second capacitor in response to a first control signal, and connecting the first capacitor and the second capacitor in series between the first node and the second node to generate a reset voltage having about half of a difference between the first voltage level and the second voltage level at an output node.

In still further the method further includes adjusting each capacitance of the first capacitor and the second capacitor in response to a second control signal to control a settling time of a voltage at the output node slewing from the reset voltage.

In other embodiments, an amplification circuit includes an amplifier that generates an output voltage level between a first voltage level and a second voltage level at an output terminal thereof in response to an input signal, and a switch circuit that resets the voltage level at the output terminal of the amplifier to a reset voltage corresponding to about one-half of a difference between the first voltage level and the second voltage level in response to a first control signal.

In still other embodiments, the amplifier further includes a first capacitor and a second capacitor connected in series between a first node that supplies the first voltage level and a second node that supplies the second voltage level. The switch circuit is operable to disconnect the first capacitor and the second capacitor from the first node and the second node, respectively, and to cross-connect the first capacitor with the second capacitor in response to the first control signal.

In still other embodiments, the switch circuit is operable to adjust each capacitance of the first capacitor and the second capacitor in response to a second control signal to control a settling time of a voltage at the output terminal of the amplifier slewing from the reset voltage.

In still other embodiments, the amplifier further includes a third capacitor connected with the first capacitor in parallel and a fourth capacitor connected with the second capacitor in parallel. The switch circuit is operable to disconnect the third capacitor from the first capacitor and to disconnect the fourth capacitor from the second capacitor in response to a second control signal.

In still other embodiments, the switch circuit includes a first switch connected between the first node and a first terminal of the first capacitor and is configurable in an on or off position in response to the first control signal, a second switch connected between the second node and a first terminal of the second capacitor and is configurable in an on or off position in response to the first control signal, a third switch connected between a second terminal of the first capacitor and the output node and is configurable in an on or off position in response to the first control signal, a fourth switch connected between the output node and a second terminal of the second capacitor and is configurable in an on or off position in response to the first control signal, a fifth switch connected between the second terminal of the first capacitor and the first terminal of the second capacitor and is configurable in an on or off position in response to the first control signal, and a sixth switch connected between the first terminal of the first capacitor and the second terminal of the second capacitor and is configurable in an on or off position in response to the first control signal.

In still other embodiments, the switch circuit includes a first switch connected between the first node and a first terminal of the first capacitor and is configurable in an on or off position in response to the first control signal, a second switch connected between the second node and a first terminal of the second capacitor and is configurable in an on or off position in response to the first control signal, a third switch connected between a second terminal of the first capacitor and the output node and is configurable in an on or off position in response to the first control signal, a fourth switch connected between the output node and a second terminal of the second capacitor and is configurable in an on or off position in response to the first control signal, a fifth switch connected between the second terminal of the first capacitor and the first terminal of the second capacitor and is configurable in an on or off position in response to the first control signal, a sixth switch connected between the first terminal of the first capacitor and the second terminal of the second capacitor and is configurable in an on or off position in response to the first control signal, a seventh switch connected between the first capacitor and the third capacitor and is configurable in an on or off position in response to the second control signal, an eighth switch connected between a node of the third capacitor and the seventh switch and a power node and is configurable in an on or off position in response to the second control signal, a ninth switch connected between the second capacitor and the fourth capacitor and is configurable in an on or off position in response to the second control signal, a tenth switch connected between a node of the fourth capacitor and the ninth switch and a ground node and is configurable in an on or off position in response to the second control signal.

In still other embodiments, the amplification circuit is embodied as a part of a source driver.

In further embodiments of the present invention, a display device includes a display panel that includes a data line, a gate line, and a pixel, and a source driver that includes an amplification circuit. The amplification circuit includes an amplifier that drives the data line with an output voltage having a voltage level between a first voltage level and a second voltage level in response to an image data, and a switch circuit that resets the output voltage of the amplifier to a reset voltage, which is about one-half of a difference between the first voltage level and the second voltage level, in response to a first control signal.

In still further embodiments, the amplifier further includes a first capacitor and a second capacitor connected in series between a first node that supplies the first voltage level and a second node that supplies the second voltage level. The switch circuit is operable to disconnect the first capacitor and the second capacitor from the first node and the second node and to cross-connect the first capacitor with the second capacitor in response to the first control signal.

In still further embodiments, the switch circuit is operable to adjust each capacitance of the first capacitor and the second capacitor in response to a second control signal to control a settling time of a voltage at the output terminal of the amplifier slewing from the reset voltage.

In still further embodiments, the amplifier further includes a third capacitor connected with the first capacitor in parallel and a fourth capacitor connected with the second capacitor in parallel. The switch circuit is operable to disconnect the third capacitor from the first capacitor and to disconnect the fourth capacitor from the second capacitor in response to a second control signal.

In other embodiments, a method of operating an amplification circuit includes setting up a voltage at an output terminal of the amplification circuit to a reset voltage of about one-half of a difference between a first voltage level and a second voltage level and slewing the voltage at the output terminal of the amplification circuit from the reset voltage level in response to an input signal.

In still other embodiments, slewing the voltage includes controlling a settling time of the voltage at the output terminal by adjusting compensation capacitance of the amplification circuit.

In still other embodiments, setting the voltage to the reset voltage includes disconnecting a first capacitor and a second capacitor connected in series from a first node that supplies the first voltage level and a second node that supplies the second voltage level, in response to a first control signal, connecting the first capacitor with the second capacitor in parallel in response to the first control signal. Then, connecting the first capacitor with the second capacitor between the first node and the second node in response to the first control signal, and outputting the reset voltage at the output terminal of the amplification circuit.

In still other embodiments, slewing the voltage at the output terminal includes controlling each capacitance of the first capacitor and the second capacitor in response to a second control signal to control a settling time of the voltage at the output terminal slewing from the reset voltage level.

In still other embodiments, slewing the voltage at the output terminal includes disconnecting a third capacitor, which is connected to the first capacitor in parallel, from the first capacitor in response to a second control signal, disconnecting a fourth capacitor, which is connected to the second capacitor in parallel, from the second capacitor in response to the second control signal, and then connecting the third capacitor and the first capacitor in parallel and the fourth capacitor and the second capacitor in parallel in response to the second control signal.

BRIEF DESCRIPTION OF THE DRAWINGS

Other features of the present invention will be more readily understood from the following detailed description of specific embodiments thereof when read in conjunction with the accompanying drawings, in which:

FIGS. 11A to 11D illustrate waveforms that illustrate characteristics of output voltages of conventional amplifiers and output voltages of amplification circuits according to some embodiments of the present invention;

DETAILED DESCRIPTION OF EMBODIMENTS

Figure 1:
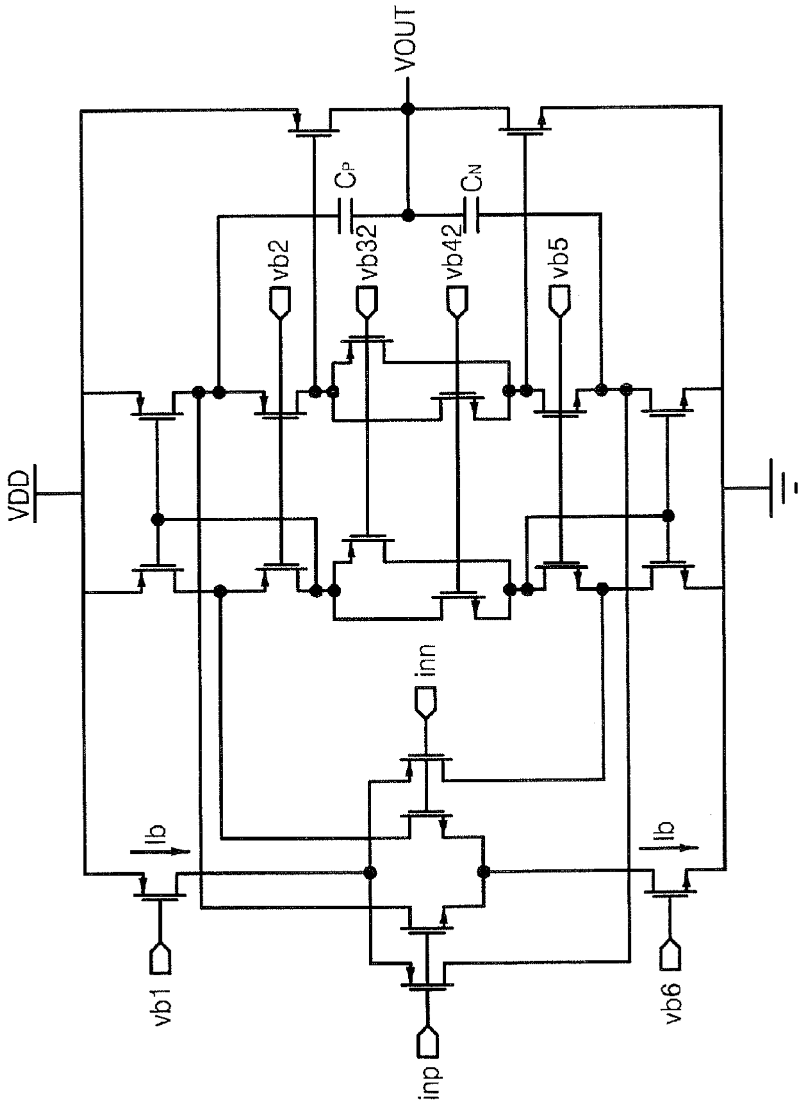
FIG. 1 (PRIOR ART)
FIG. 1 is a schematic that illustrates a conventional source driver amplifier circuit.
Figure 2A:
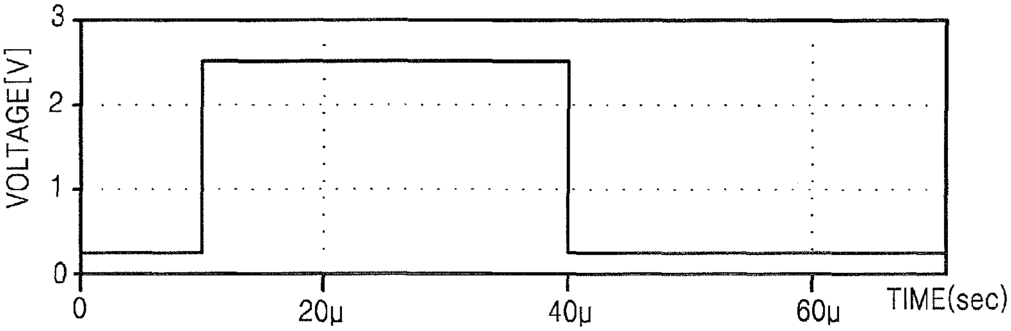
FIG. 2A (PRIOR ART)
FIGS. 2A and 2B illustrate plots of an input voltage waveform applied to the amplifier of FIG. 1 and the output voltage waveform generated in response to the input voltage waveform, respectively.
Figure 2B:
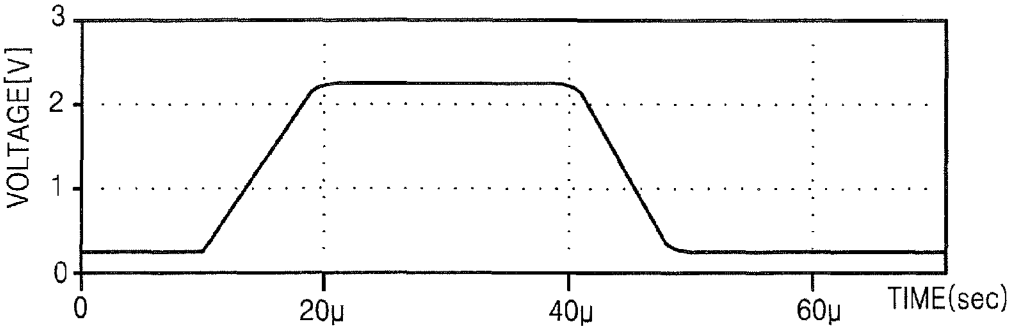
FIG. 2B (PRIOR ART)

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements. As used herein, the term "and/or" and "/" includes any and all combinations of one or more of the associated listed items. Like numbers refer to like elements throughout the description.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first and second are used herein to describe various components, circuits, regions, layers and/or sections, these components, circuits, regions, layers and/or sections should not be limited by these terms. These terms are only used to distinguish one component, circuit, region, layer or section from another component, circuit, region, layer or section. Thus, a first component, circuit, region, layer or section discussed below could be termed a second component, circuit, region, layer or section, and similarly, a second component, circuit, region, layer or section may be termed a first component, circuit, region, layer or section without departing from the teachings of the present invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention stem from a realization that because the bias current of a conventional source driver amplifier is relatively small, the dominant factor that limits the driving time of the amplifier is the speed at which the compensation capacitors can be charged and discharged. According to some embodiments of the present invention, the output of an amplifier circuit can be driven to half-VDD relatively quickly through charge-sharing before the amplifier is driven to a new voltage. Advantageously, according to some embodiments of the present invention, the output of the amplifier circuit can be driven to half-VDD through charge sharing instead of by current, which allows the amplifier's power consumption to be reduced.

Figure 3:
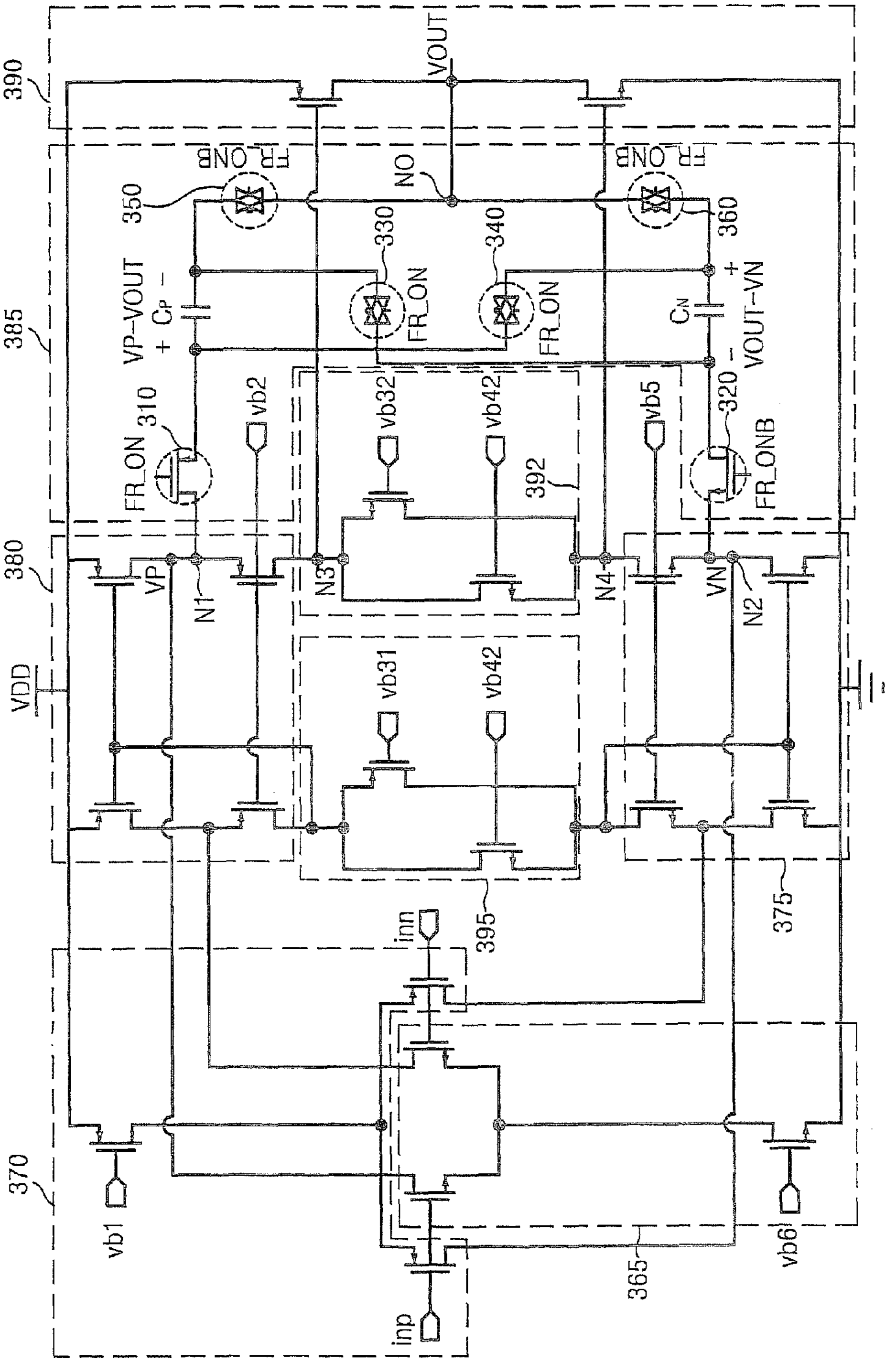
FIG. 3 is a schematic that illustrates a circuit that includes an amplifier circuit and a reset control circuit, according to some embodiments of the present invention.

Referring to FIG. 3, a circuit 300 that includes an amplifier circuit and a reset control circuit, according to some embodiments of the present invention, is illustrated. The reset control circuit includes six switches 310, 320, 330, 340, 350, and 360 that are configured as shown. The switches 310, 320, 330, 340, 350, and 360 are operable to connect and disconnect the compensation capacitors $C_P$ and $C_N$ from the remainder of the circuit 300 to facilitate charge-sharing between the compensation capacitors $C_P$ and $C_N$ responsive to a control signal (FR_ON). When the switches 310, 320, 350, and 360 are closed and switches 330 and 340 are open, the compensation capacitors $C_P$ and $C_N$ are connected in series between a power node that provides a power voltage level VDD and a common reference node, e.g., ground, that provides a common reference voltage level.

Figure 4:
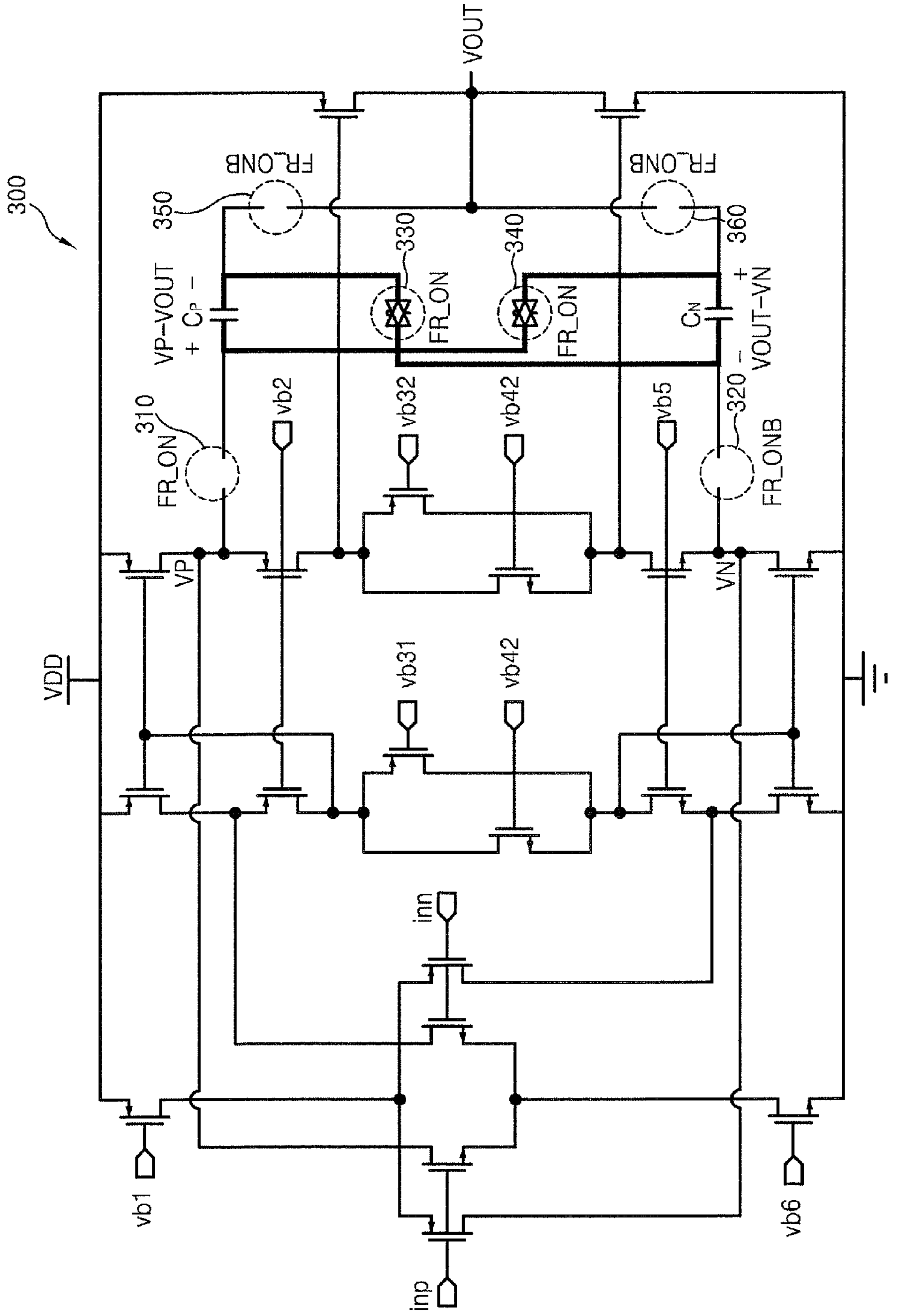
FIG. 4 is a schematic that illustrates the circuit of FIG. 3 in which certain switches are open and certain switches are closed to disconnect the compensation capacitors from the remainder of the circuit and to cross-connect the compensation capacitors so as to share charge between them, according to some embodiments of the present invention.

FIG. 4 illustrates the circuit 300 of FIG. 3 in which switches 310, 320, 350, and 360 are open and switches 330 and 340 are closed to disconnect the compensation capacitors $C_P$ and $C_N$ from the remainder of the circuit 300 and to cross-connect the compensation capacitors $C_P$ and $C_N$ so as to share charge between them. As shown by the equations below, by cross-connecting the compensation capacitors $C_P$ and $C_N$, the voltage level VOUT at the output node of the circuit can be reset to about one-half VDD. The total charge on compensation capacitor $C_P$ is given by Equation 1:

$$Q_P = C_P(VP - VOUT) \qquad \text{EQ. 1}$$

Similarly, the total charge on compensation capacitor $C_N$ is given by Equation 2:

$$Q_N = C_N(VOUT - VN) \qquad \text{EQ. 2}$$

The total charge is given by Equation 3:

$$Q_T = Q_N + Q_P \qquad \text{EQ. 3}$$

Assuming $C_P$ is approximately equal to $C_N$, then Equation 3 can be rewritten as Equation 4:

$$Q_T = C_P(VP - VOUT) + C_N(VOUT - VN) = C_P(VP - VN) \qquad \text{EQ. 4}$$

When the two compensation capacitors $C_P$ and $C_N$ are connected in parallel, the voltage drop across the two compensation capacitors $C_P$ and $C_N$ is given by Equation 5:

$$V_T = Q_T / 2C_P \qquad \text{EQ. 5}$$

Substituting Equation 4 into Equation 5 results in Equation 6:

$$V_T = (VP - VN)/2 \qquad \text{EQ. 6}$$

When the two compensation capacitors $C_P$ and $C_N$ are connected in parallel, the voltage VOUT is given by Equation 7:

$$VOUT = VP - V_T = VP - (VP - VN)/2 \sim= VDD/2 \qquad \text{EQ. 7}$$

Figure 5A:
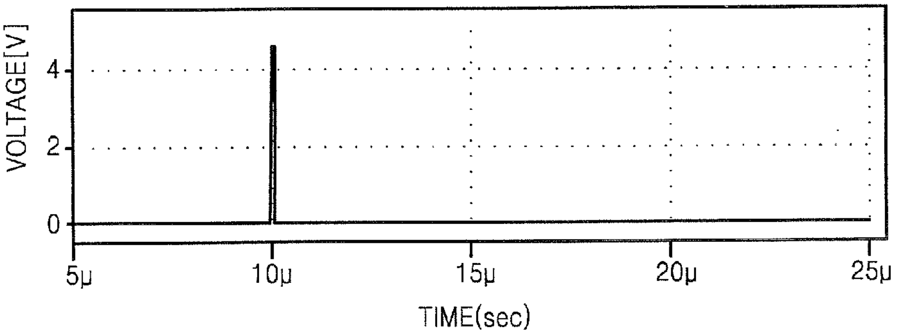
FIGS. 5A and 5B are waveform diagrams that illustrate the control signal FR_ON of FIGS. 3 and 4 and the output voltage VOUT of FIGS. 3 and 4 that is generated in response thereto, respectively.
Figure 5B:
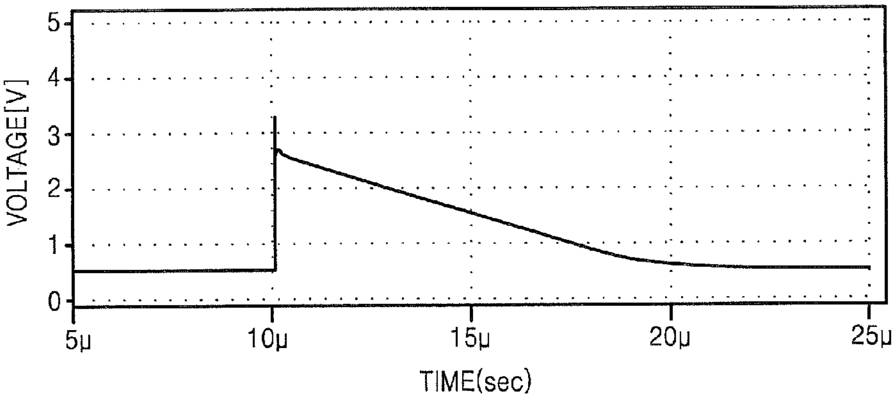

FIGS. 5A and 5B are waveforn diagrams that illustrate the control signal FR_ON and the output voltage VOUT that is generated in response thereto, respectively. At a time of approximately 10 μsec, the control signal FR_ON is pulsed, which opens switches 310, 320, 350, and 360 and closes switches 330 and 340 so as to disconnect the compensation capacitors $C_P$ and $C_N$ from the remainder of the circuit 300 and to cross-connect the compensation capacitors $C_P$ and $C_N$ in parallel so as to share charge between them. As shown in FIG. 5B, the output voltage VOUT is driven to a voltage of about VDD/2 in response to the pulse of the control signal FR_ON. The voltage VOUT then decreases over time based on the time constant associated with the circuit as the charge dissipates from the compensation capacitors $C_P$ and $C_N$.

Figure 6A:
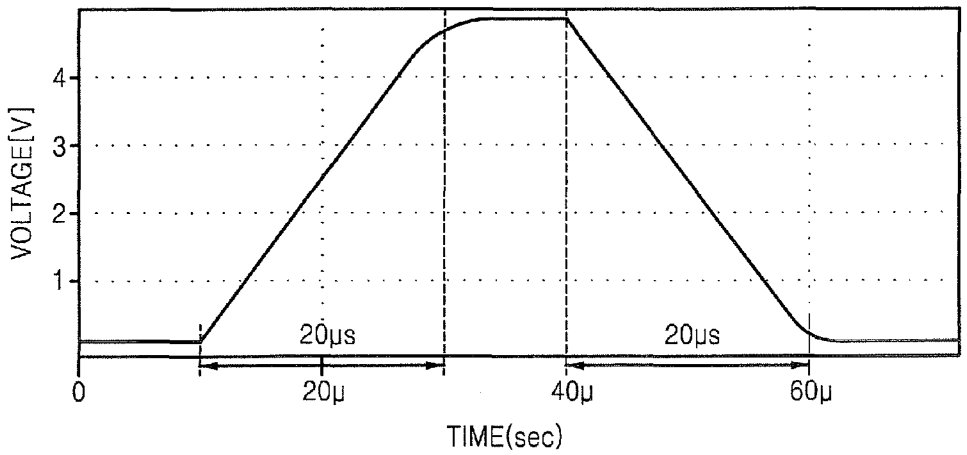
FIG. 6A (PRIOR ART)
FIGS. 6A and 6B are waveform diagrams that illustrate the output voltage for a conventional source amplifier driver circuit and the circuit of FIG. 3, respectively.
Figure 6B:
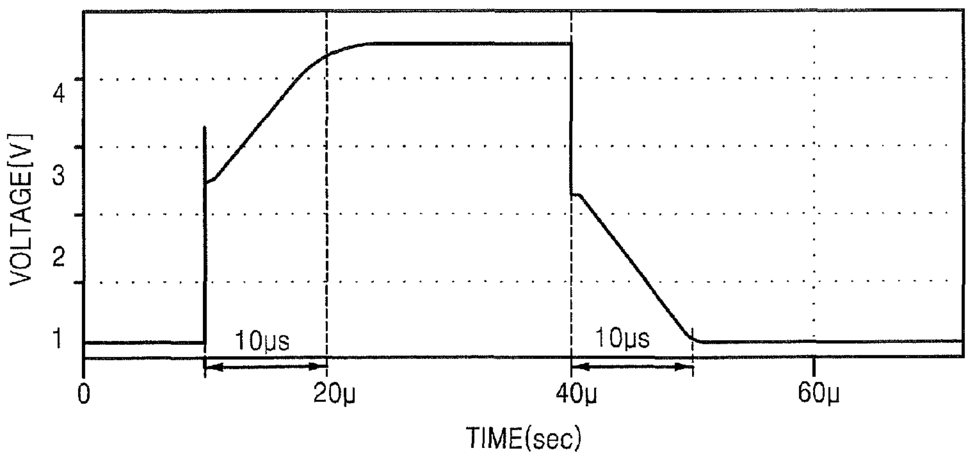

FIGS. 6A and 6B are waveform diagrams that illustrate the output voltage (VOUT) for a conventional source amplifier driver circuit and the circuit 300 of FIG. 3, respectively. Referring to FIG. 6A, the conventional source amplifier driver circuit drives the output voltage VOUT from a common reference voltage level to about a power supply voltage level in approximately 20 μsec. By contrast, the circuit 300 of FIG. 3 drives the output voltage VOUT to approximately VDD/2 almost immediately at the 10 μsec time point in response to a pulse of the control signal FR_ON as shown in FIG. 6B. It then takes approximately 10 μsec for the voltage VOUT to reach a level about equal to the power supply voltage level. Thus, the circuit 300, according to some embodiments of the present invention, may drive an output voltage to a level about equal to a power supply voltage in approximately half the time that a conventional source driver amplifier circuit requires. Similarly, at the 40 μsec time point, the conventional source amplifier driver circuit drives the output voltage VOUT from about a power supply voltage level to a common reference voltage level, e.g., ground. The voltage VOUT reaches the common reference voltage level in approximately 20 μsec as shown in FIG. 6A. By contrast, the circuit 300 of FIG. 3 drives the output voltage VOUT to approximately VDD/2 almost immediately at the 40 μsec time point in response to a pulse of the control signal FR_ON as shown in FIG. 6B. It then takes approximately 10 μsec for the voltage VOUT to reach a level about equal to the common reference voltage level, e.g., ground.

Advantageously, according to some embodiments of the present invention, the output of an amplifier circuit can be driven to about half-VDD relatively quickly through charge-sharing before the amplifier is driven to a new voltage. The amplifier circuit may be used, for example, to drive a thin film transistor (TFT) panel at a higher frequency, which may be particularly useful in mobile terminal application. Moreover, according to some embodiments of the present invention, the output of the amplifier circuit can be driven to about half-VDD through charge sharing instead of by current, which allows the amplifier's power consumption to be reduced.

Returning to FIG. 3, the circuit 300 further includes an input differential amplifier circuit that comprises an NMOS differential amplifier circuit 365 and a PMOS differential amplifier circuit 370 that are connected to an NMOS current mirror circuit 375 and a PMOS current mirror circuit 380, respectively. The switches 310, 320, 330, 340, 350, and 360 along with the compensation capacitors $C_P$ and $C_N$ may be viewed as comprising a reset control circuit 385 that is responsive to the control signal FR_ON. The reset control circuit 385 couples the current mirror circuits 375 and 380 to an output stage circuit 390. A control circuit 392 is used to control the current through the output stage circuit 390 so that the output branch circuit 390 operates as a class AB amplifier circuit. A bias circuit 395, which may be a floating current source circuit as shown in FIG. 3, couples the NMOS current mirror circuit 375 to the PMOS current mirror circuit 380. For use as a source driver amplifier circuit, the circuit 300 provides unit gain. Accordingly, the voltage VOUT at the output node is fed back to the input differential amplifier circuit 365, 370. During a reset of the output voltage VOUT to about half-VDD, however, if the output node of the output stage circuit 390 remains connected to the input differential amplifier circuit 365, 370, then the circuit 300 may enter an oscillation state, which may draw additional current. Thus, the reset control circuit 385 uses switches 310, 320, 350, and 360 to completely disconnect the output stage circuit 390 from the remainder of the circuit 300 during a reset of the output voltage VOUT to about half-VDD.

Figure 7:
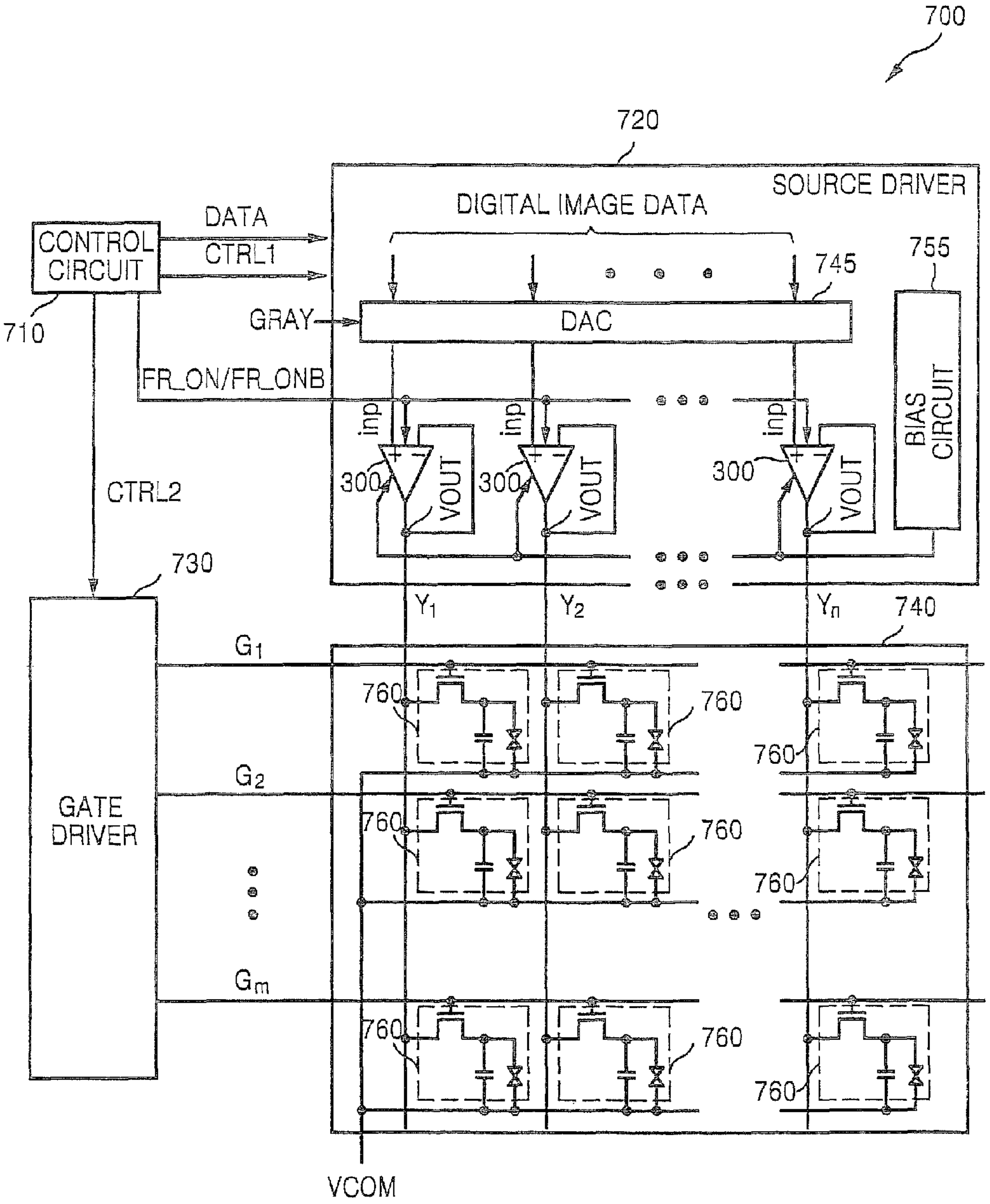
FIG. 7 is a schematic that illustrates a driver system for a display, such as a Thin Film Transistor-Liquid Crystal Display (TFT-LCD) display, in accordance with some embodiments of the present invention.

FIG. 7 illustrates a driver system 700 for a display, such as a Thin Film Transistor-Liquid Crystal Display (TFT-LCD) display, in accordance with some embodiments of the present invention. The driver system 700 includes a control circuit 710, an image data driver circuit 720, a gate driver circuit 730, and a TFT-LCD panel 740 that are configured as shown. The image data driver circuit 720 includes a digital-to-analog converter (DAC) 745 that is coupled to a plurality of amplifier circuits 750. Each of the amplifier circuits may be embodied as the circuit 300 of FIG. 3 in accordance with some embodiments of the present invention. A bias circuit 755 may be used to bias the amplifier circuits 750. The TFT-LCD panel 740 includes a plurality of liquid crystal capacitor circuits 760 that are responsive to voltages generated at the outputs of the plurality of amplifier circuits 750.

Exemplary operations of the driver system 700, according to some embodiments of the present invention, will now be described. The control circuit 710 may be configured to communicate with a microcontroller, for example, to obtain RGB image data to be displayed on the display panel 740. The control circuit 710 communicates the RGB image data to the image data driver circuit 720. The image data driver circuit 720 includes a DAC 745 that generates gray scale analog voltages responsive to the digital image data and a control signal GRAY. The gray scale analog voltages output from the DAC 745 are provided as inputs to the amplifier circuits 750, each of which may be embodied as the circuit 300 of FIG. 3. The amplifier circuits 750 are used to drive source lines Y1 through Yn corresponding to one dimension of an array of pixels provided by the display panel 740 to voltage levels between a power voltage level (e.g., VDD) and a common reference voltage level (e.g., ground) responsive to the output gray scale voltages of the DAC 745, the reset control signal FON generated by the control circuit 710, and the control signal CTRL1. The reset control signal FON may correspond to the reset control signal FR_ON of FIG. 3.

The display panel 740 includes an array of liquid crystal capacitor circuits 760 respectively corresponding to individual pixels. The gate driver circuit 730 selectively scans gate lines G1 through Gm of the array of liquid crystal capacitor circuits 760 or pixels along one dimension of the array in response to a control signal CTRL2 generated by the control circuit 710. In concert with the scan by the gate driver circuit 730, the amplifiers 750 drive the sources lines Y1 through Yn along a second dimension of the array with gray scale voltage levels-to display an image on the display panel 740. In more detail, when the gate driver 730 turns on a switch of a liquid crystal capacitor circuit 760, then an amplifier circuit 750 can apply a gray scale voltage to a liquid crystal capacitor that is connected to the switch.

As discussed above with respect to FIGS. 6A and 6B, the circuit 300 of FIG. 3, which can be used to implement each of the amplifier circuits 750, can operate at approximately twice the frequency of a conventional amplifier circuit. This may allow the display panel 740 to include a larger array of liquid crystal capacitor circuits 760 or pixels to provide increased resolution without consuming additional current.

Figure 8:
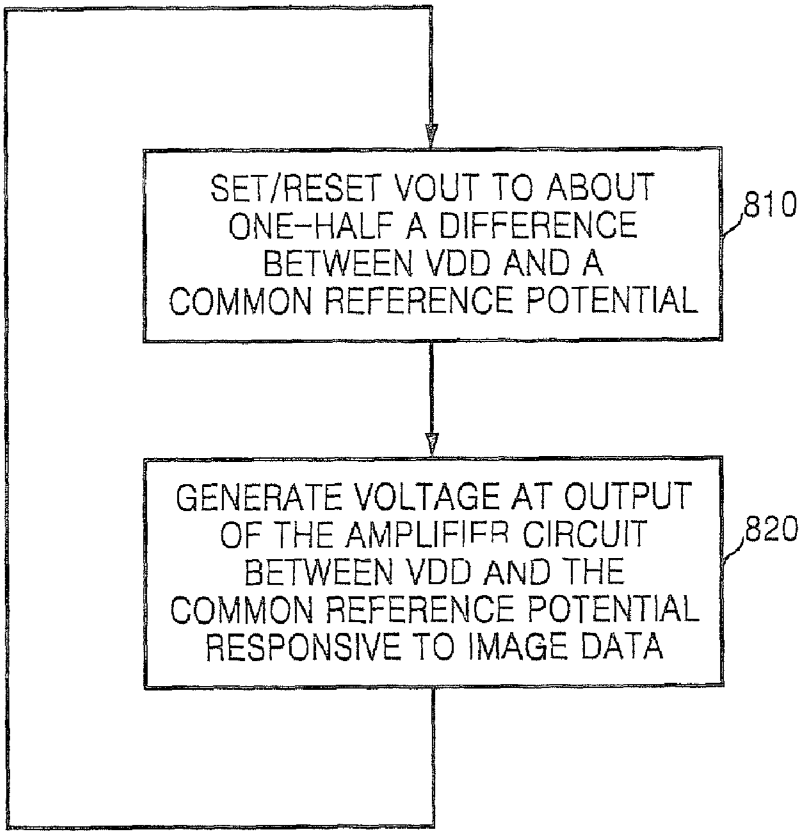
FIG. 8 is a flowchart that illustrates operations for operating a source driver amplifier circuit according to some embodiments of the present invention.

Exemplary operations for operating a source driver amplifier circuit, such as the circuit 300 of FIG. 3, according to some embodiments of the present invention, will now be described with reference to FIG. 8. Operations begin at block 810 where the circuit 300 sets/resets an output voltage VOUT at a voltage level of about one-half of a difference between a power voltage level (VDD) and a common reference voltage level (e.g., ground). At block 820, a voltage level between the power voltage level and the common reference voltage level is generated at the output of the amplifier circuit responsive to image data. In this way, the circuit 300 may be used to drive a TFT-LCD panel, such as the display panel 740 of FIG. 7 at higher frequencies than may be possible using the source driver amplifier circuit of FIG. 1.

Figure 9A:
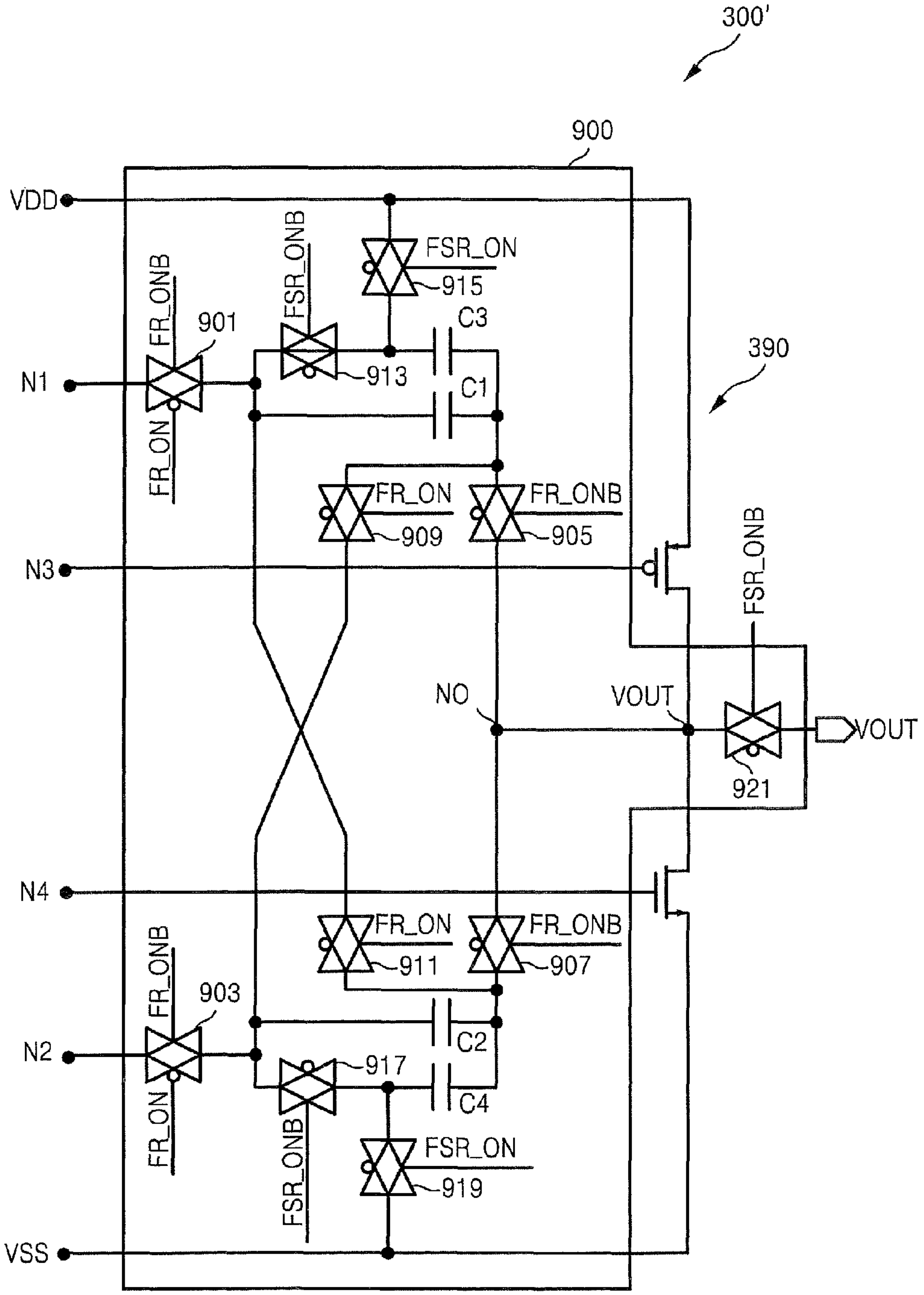
FIG. 9A is a schematic of an amplification circuit including a switch circuit according to some embodiments of the present invention.
Figure 9B:
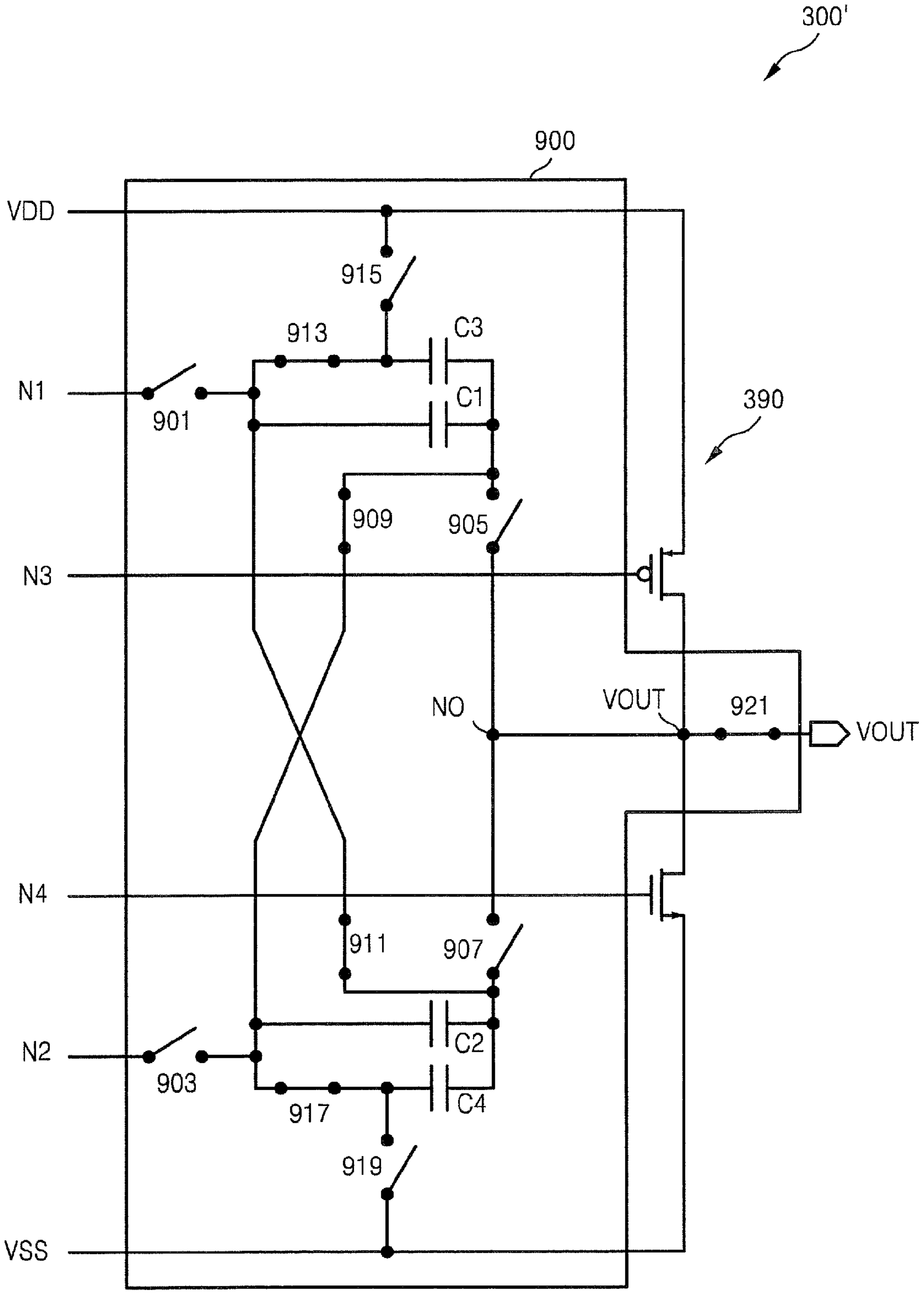
FIG. 9B is a schematic of the amplification circuit of FIG. 9A including a switch arrangement that illustrates a fast reset operation according to some embodiments of the present invention.
Figure 9C:
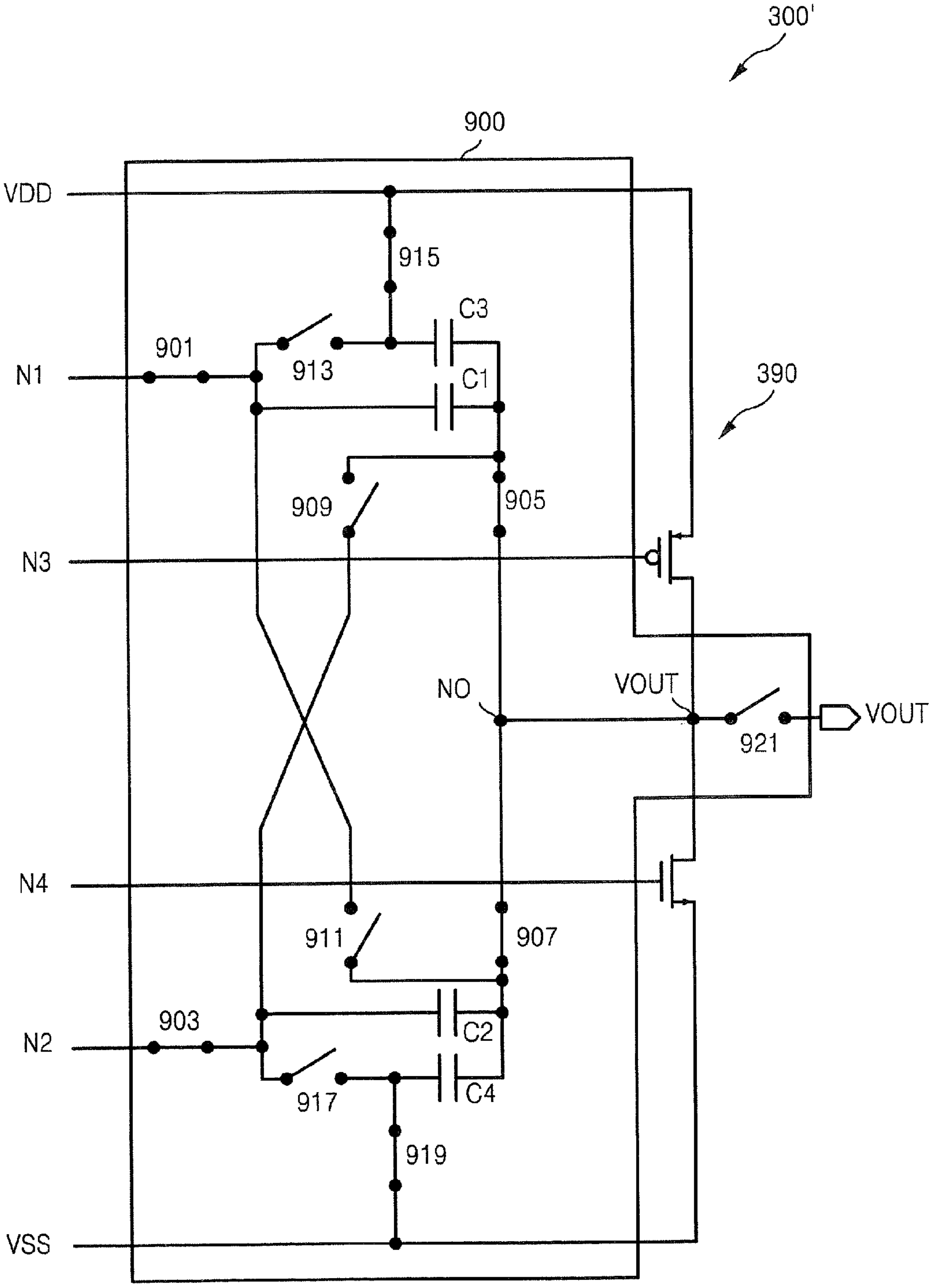
FIG. 9C is a schematic of the amplification circuit of FIG. 9A including a switch arrangement that illustrates a fast slew rate operation according to some embodiments of the present invention.
Figure 10:
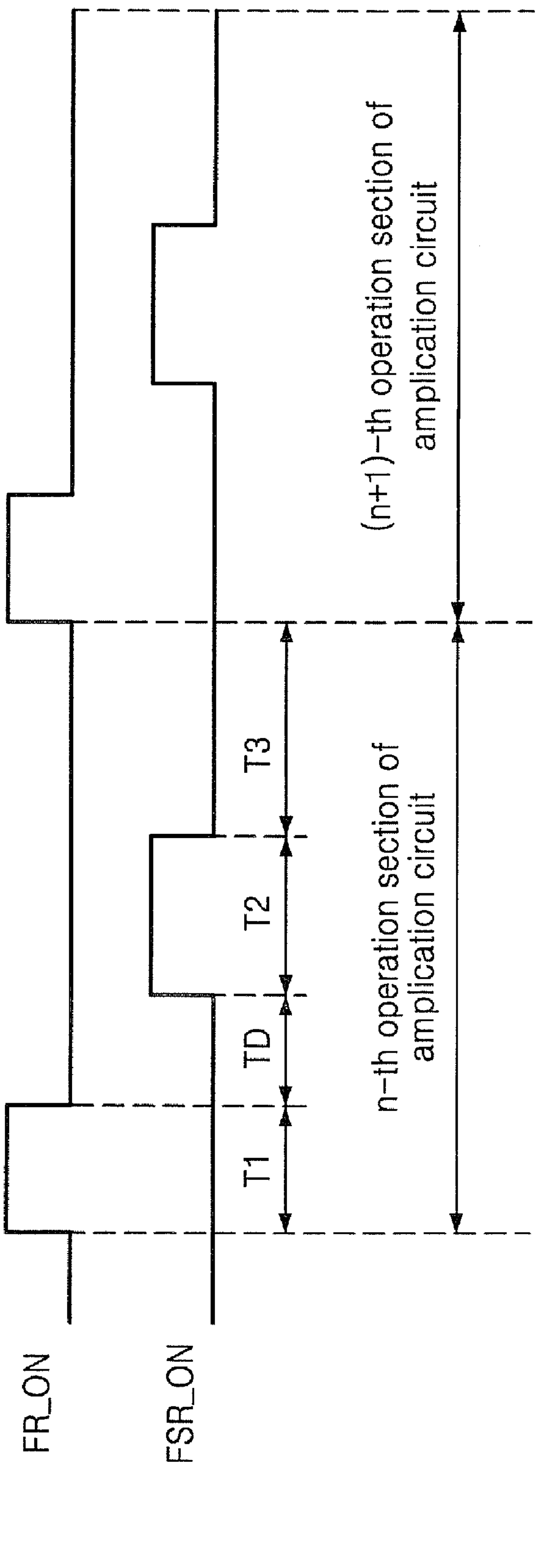
FIG. 10 illustrates waveforms of a first control signal and a second control signal according to some embodiments of the present invention.

FIG. 9A is a schematic of an amplification circuit 300' including a switch circuit 900 according to some embodiments of the present invention, and FIG. 9B is a schematic of the amplification circuit 300' of FIG. 9A including a switch arrangement that illustrates a fast reset operation according to some embodiments of the present invention. FIG. 9C is a schematic of the amplification circuit 300' of FIG. 9A including a switch arrangement that illustrates a fast slew rate operation according to some embodiments of the present invention, and FIG. 10 illustrates waveforms of a first control signal FR_ON and a second control signal FSR_ON.

The amplification circuit 300' excluding a switch circuit 900 (or, reset control circuit) is substantially the same as an amplification circuit 300 illustrated in FIG. 3. The switch circuit 900 includes a first compensation capacitor C1, a second compensation capacitor C2, a third compensation capacitor C3, a fourth compensation capacitor C4, and a switch arrangement. The first compensation capacitor C1 through the fourth compensation capacitor C4 may be embodied in an input differential amplifier. The total compensation capacitance of the switch circuit 900 may be adjusted in response to a second control signal FSR_ON.

The switch circuit 900 resets an output voltage VOUT of an output node NO to a reset voltage in response to a first control signal FR_ON and controls the settling time of the output voltage VOUT slewing from the reset voltage by adjusting the total compensation capacitance in response to the second control signal FSR_ON.

The switch arrangement includes a plurality of switches 901, 903, 905, 907, 909, 911, 913, 915, 917, 919, and 921. The plurality of switches 901, 903, 905, 907, 909, and 911 are respectively turned on/off in response to the first control signal FR_ON. The plurality of switches 913, 915, 917, 919, and 921 are respectively turned on/off in response to the second control signal FSR_ON. The switch circuit 900 may also be embodied without a switch 921.

A control signal FR_ONB may be a complementary signal to the first control signal FR_ON, and a control signal FSR_ONB may be a complementary signal to the second control signal FSR_ON. The plurality of switches 901, 903, 905, 907, 909, 911, 913, 915, 917, 919, and 921 may be respectively embodied as a PMOS transistor, an NMOS transistor, or a transmission gate using CMOS.

Referring to FIGS. 3, 9A, 9B, and 10, each switch 901, 903, 905, and 907 before a T1 section is closed in response to a first control signal FR_ON having a first level, e.g., a low level, and each switch 913, 917, and 921 is closed in response to a second control signal FSR_ON having a first level. Switches 909 and 911 are respectively opened in response to a first control signal FR_ON having a first level, and switches 915 and 919 are respectively opened in response to a second control signal FSR_ON having a first level.

According to such switch arrangement, a voltage VP of a first node N1 and a voltage VN of a second node N2 are supplied to a switch circuit 900. Accordingly, a voltage at both ends of a first capacitor C1 and a third capacitor C3, which are connected in parallel, is VP-VOUT and a voltage at both ends of a second capacitor C2 and a fourth capacitor C4, which are connected in parallel, is VOUT-VN.

During a T1 time period that a fast reset operation is performed, i.e., when control signals FR_ON and FSR_ONB have a second level and control signals FR_ONB and FSR_ON have a first level, switches 901, 903, 905, 907, 915, and 919 are respectively opened and switches 909, 911, 913, 917, and 921 are respectively closed.

According to such a switch arrangement, the compensation capacitors C1 to C4 are cross-connected in parallel. Similar to Equations 1 through 7, a voltage level at both ends of each of the compensation capacitors C1 to C4 cross-connected in parallel becomes about a half of the difference between a power supply voltage level VDD and a common reference voltage level, e.g., ground.

During a TD time period right after a fast reset operation is terminated, switches 901, 903, 905, 907, 913, 917, and 921 are respectively closed and switches 909, 911, 915, and 919 are respectively opened. Therefore, a voltage level VOUT of an output node NO of a switch circuit 900 becomes a reset voltage level approximately instantaneously.

Referring to FIG. 9C, during a T2 time period in which a fast slew rate operation is performed, switches 901, 903, 905, and 907 are respectively closed in response to a first control signal FR_ON having a first level, and switches 915 and 919 are respectively closed in response to a second control signal FSR_ON having a second level. And switches 909 and 911 are respectively opened in response to the first control signal FR_ON having a first level, and switches 913, 917, and 921 are respectively opened in response to a second control signal FSR_ON having a second level.

According to such a switch arrangement, a first capacitor C1 and a second capacitor C2 are connected in series between a first node N1 and a second node N2, and a third capacitor C3 and a fourth capacitor C4 are respectively disconnected from the first capacitor C1 and the second capacitor C2.

During a T3 time period after a fast slew rate operation is terminated, switches 901, 903, 905, 907, 913, 917, and 921 are respectively closed and switches 909, 911, 915, and 919 are respectively opened. Therefore, a first capacitor C1 and a second capacitor C2 are connected in series between a first node N1 and a second node N2, and a third capacitor C3 and a fourth capacitor C4 are respectively connected again in parallel to a first capacitor C1 and a second capacitor C2, respectively.

The total capacitance of compensation capacitors C1 and C2 in a T2 time period is smaller than total capacitance of compensation capacitors C1 to C4 in a T3 time period. Slew rate SR is in inverse proportion to total capacitance of the compensation capacitors; therefore, the slew rate SR in the T2 time period is higher than the slew rate SR during the T3 time period. That is, a switch circuit 900, according to some embodiments of the present invention, may control slew rate SR by adjusting total capacitance of compensation capacitors based on a second control signal FSR_ON.

Figure 13:
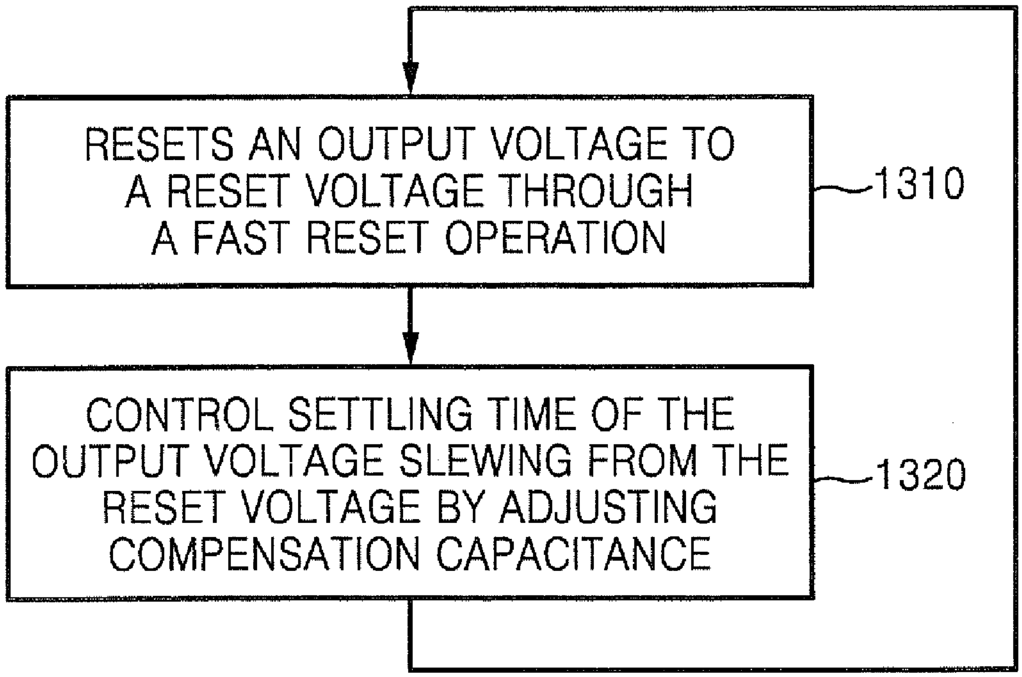
FIG. 13 is a flowchart illustrating operations of the amplification circuit illustrated in FIG. 9A according to some embodiments of the present invention.

FIG. 13 is a flowchart showing operations of the amplification circuit 300' illustrated in FIG. 9A. Referring to FIG. 13, the amplification circuit 300', according to some embodiments of the present invention, resets an output voltage VOUT to a reset voltage through a fast reset operation (1310). Afterwards, the amplification circuit 300' may control the settling time of an output voltage slewing from the reset voltage by adjusting total compensation capacitance of the switch circuit 900 through a fast slew rate operation (1320). Also, a switch circuit 900, according to some embodiments of the present invention, may be used in an amplification circuit 300' of a source driver.

FIG. 11A illustrates a waveform 1 of an output voltage of a conventional amplifier illustrated in FIG. 1, a waveform 2 of an output voltage of a conventional amplifier using FSR technology, a waveform 3 of an output voltage of an amplification circuit 300 illustrated in FIG. 3, and a waveform 4 of an output voltage of an amplification circuit 300' illustrated in FIG. 9A. Referring to FIGS. 11A and 11D, settling time of an amplification circuit 300' illustrated in FIG. 9A, e.g., rising time or falling time, is the fastest and settling time of an amplification circuit 300 illustrated in FIG. 3 is the second fastest.

FIG. 11B illustrates a voltage waveform with a load connected to an output node NO of a conventional amplifier illustrated in FIG. 1, a voltage waveform 12 with a load connected to an output node of a conventional amplifier using FSR technology, a voltage waveform 13 with a load connected to an output node NO of an amplification circuit 300 illustrated in FIG. 3, and a voltage waveform 14 with a load connected to an output node NO of an amplification circuit 300' illustrated in FIG. 9A.

FIG. 11C illustrates a current waveform 21 of a node supplying a power supply voltage to a conventional amplifier, a current waveform 22 of a node supplying a power supply voltage to a conventional amplifier using FSR technology, a current waveform 23 of a node supplying a power supply voltage to an amplification circuit 300 illustrated in FIG. 3, and a current waveform 24 of a node supplying a power supply voltage to an amplification circuit 300' illustrated in FIG. 9A. FIG. 11D illustrates each consuming current, rising time Tr, and falling time Tf of a conventional amplifier (Normal) illustrated in FIG. 1, an amplifier (FSR) using conventional FSR technology, an amplification circuit (FR) illustrated in FIG. 3, and an amplification circuit (FR+SFR) illustrated in FIG. 9A, respectively.

Figure 12:
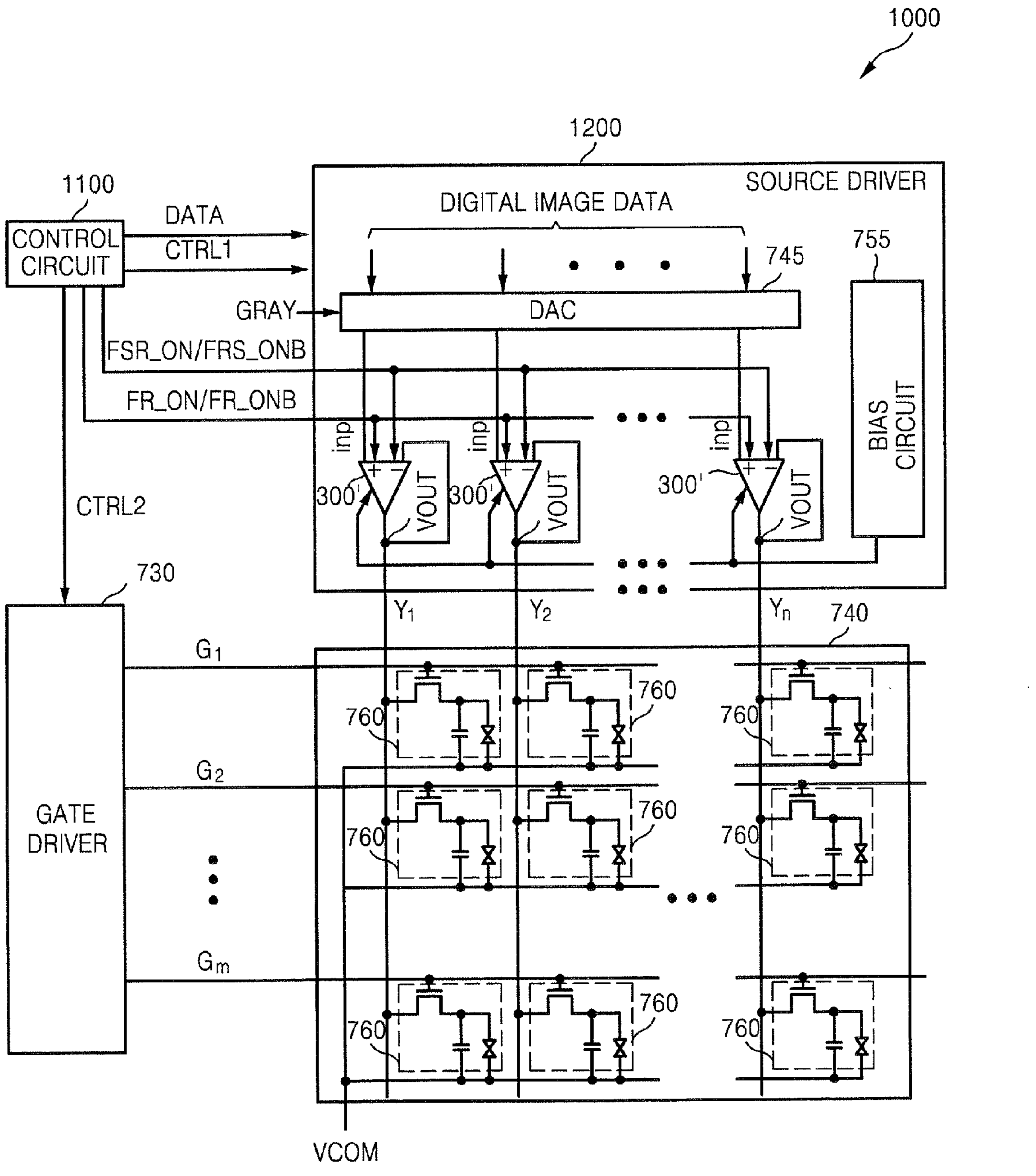
FIG. 12 is a block diagram of a display device including the amplification circuit illustrated in FIG. 9A according to some embodiments of the present invention.

FIG. 12 illustrates a block diagram of a display device including an amplification circuit illustrated in FIG. 9A according to some embodiments of the present invention. The display device 1000 includes a control circuit 1100, an image data driver (or a source driver) 1200, a gate driver 730, and a display panel 740.

The control circuit 1100 generates a first control signal FR_ON and a second control signal FSR_ON illustrated in FIG. 10. The control circuit 1100 may control at least one of the T1 time period, TD time period, and/or T2 time period. For example, the control circuit 1100 may set the TD time period to zero. Accordingly, an output voltage VOUT of the amplification circuit 300' begins slewing from the reset voltage after being reset to a reset voltage and may have decreased settling time.

The control circuit 1100 communicates with a micro-controller(not shown) to get RGB image data, which is displayed in the display panel 740. The control circuit 1100 transmits the RGB image data DATA and a plurality of control signals CTRL1 to the image data driver 1200.

The image data driver 1200 drives a plurality of data lines Y1 to Yn, where n is a natural number, in response to RGB image data DATA and a plurality of control signals CTRL1 output from a control circuit 1100.

The image data driver 1200 includes a DAC 745 connected to a plurality of amplification circuits 300'. The DAC 745 selects one of a plurality of gray scale voltages GRAY based on RGB image data DATA output from a control circuit 1100 and outputs analog voltages corresponding to the RGB image data DATA.

The analog voltages output from the DAC 745 are respectively provided as an input signal of a corresponding amplification circuit 300' among a plurality of amplification circuits 300'. A bias circuit 755 supplies a plurality of bias voltages vb1, vb2, vb31, vb32, vb41, vb42, vb5, and vb6 to a plurality of amplification circuits 300', respectively, for each bias of the plurality of amplification circuit 300'.

In response to analog voltages output from a DAC 745, a first control signal FR_ON and a second control signal FSR_ON generated by a control circuit 1100, and a plurality of bias voltages vb1, vb2, vb31, vb32, vb41, vb42, vb5, and vb6 generated by a bias circuit 755, a plurality of amplification circuits 300' drives a plurality of data lines Y1 to Yn, where n is a natural number, with voltage levels between a power supply voltage level, e.g., VDD, and a common reference voltage level, e.g., ground.

The gate driver 730 scans gate lines G1 to Gm, where m is a natural number, of a plurality of liquid crystal capacitor circuits, e.g., pixels 760, selectively in response to a control signal CTRL2 generated by a control circuit 1100. During scanning of the gate driver 730, the amplification circuits 300' drive a plurality of data lines Y1 to Yn according to analog voltages to display an image on a display panel 740. In more detail, the gate driver 730 turns on a switch of a liquid crystal capacitor circuit and the amplification circuit 300' supplies an analog voltage to a liquid crystal capacitor connected to the switch.

As described above, an amplification circuit, according to some embodiments of the present invention, may reset an output voltage of the amplification circuit to a reset voltage quickly when a fast reset operation is performed. Accordingly, the amplification circuit may reduce settling time of an output voltage and may perform relatively fast switching and operate at a high frequency.

An amplification circuit according to some embodiments of the present invention, when a fast reset operation is performed, may reduce power consumption and reset the output voltage to the reset voltage quickly because the amplification circuit resets the output voltage to the reset voltage by re-distributing electric charge stored in each compensation capacitor, not by using current generated by a power supply voltage.

Accordingly, because an amplification circuit according to embodiments of the present invention may decrease driving time, a source driver including a plurality of amplification circuits according to some embodiments of the present invention may drive a display panel having higher resolution without additional power consumption.

As described above, an amplification circuit, according to some embodiments of the present invention, may reduce reset time and a current consumed in a reset operation, so that power consumption of a source driver, which includes an amplification circuit according to the present invention, and a display device including an amplification circuit according to the present invention, may be reduced.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

That which is claimed:

1. A switch circuit, comprising:

a first capacitor;

a second capacitor; and a switch arrangement that is operable to transition the first capacitor and the second capacitor between a first state in which the first capacitor and the second capacitor are connected in series between a first node that supplies a first voltage level and a second node that supplies a second voltage level and a second state in which the first capacitor and the second capacitor are disconnected from the first node and the second node, respectively, and are cross connected to each other in response to a first control signal.

2. The switch circuit of claim 1, wherein the switch arrangement is operable to adjust each capacitance of the first capacitor and the second capacitor in response to a second control signal.

3. The switch circuit of claim 1, further comprising:

a third capacitor and a fourth capacitor, wherein the switch arrangement is operable to transition the third capacitor and the fourth capacitor between a first state in which the third capacitor and the first capacitor are connected in parallel and the fourth capacitor and the second capacitor are connected in parallel and a second state in which the third capacitor is disconnected from the first capacitor and the fourth capacitor is disconnected from the second capacitor in response to a second control signal.

4. A method of operating a switch circuit, comprising:

disconnecting a first capacitor and a second capacitor connected in series from a first node supplying a first voltage level and a second node supplying a second voltage level and cross-connecting the first capacitor with the second capacitor in response to a first control signal; and connecting the first capacitor and the second capacitor in series between the first node and the second node to generate a reset voltage at about half of a difference between the first voltage level and the second voltage level at an output node.

5. A method of operating a switch circuit, comprising:

disconnecting a first capacitor and a second capacitor connected in series from a first node supplying a first voltage level and a second node supplying a second voltage level and cross-connecting the first capacitor with the second capacitor in response to a first control signal;

connecting the first capacitor and the second capacitor in series between the first node and the second node to generate a reset voltage at about half of a difference between the first voltage level and the second voltage level at an output node; and adjusting each capacitance of the first capacitor and the second capacitor in response to a second control signal to control a settling time of a voltage at the output node slewing from the reset voltage.

* * * * *